Figure 1:
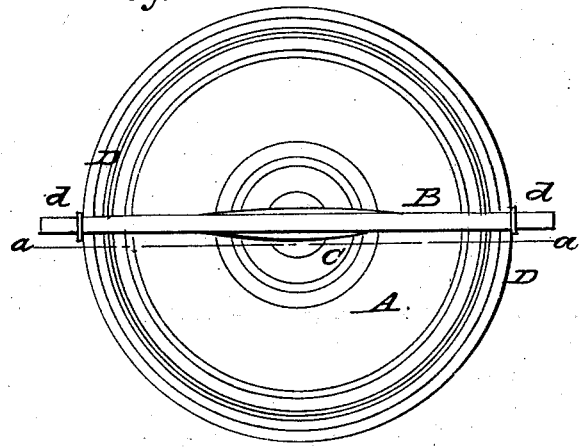
Figure 2:
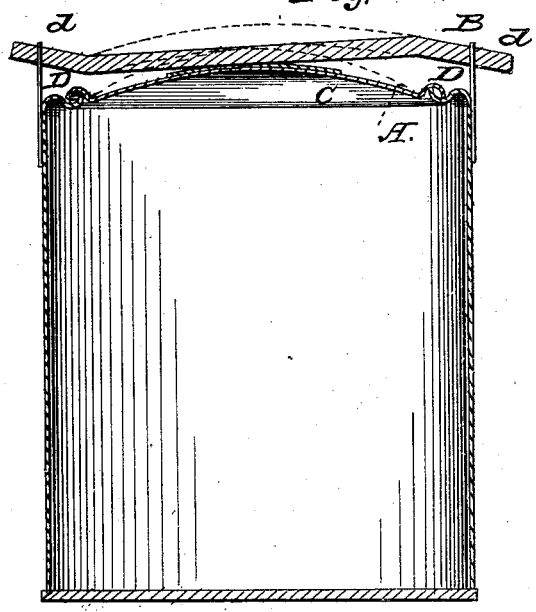

W. WEBSTER.
Closing Fruit Cans.

No. 41,657.

Patented Feb. 16, 1864.

WITNESSES.

INVENTOR.

UNITED STATES PATENT OFFICE.

WILLIAM WEBSTER, OF MIDDLETOWN, OHIO.

IMPROVEMENT IN CLOSING FRUIT-CANS.

Specification forming part of Letters Patent No. 41,657, dated February 16, 1864.

*To all whom it may concern:*

Be it known that I, WILLIAM WEBSTER, of Middletown, in the county of Butler and State of Ohio, have invented a new and Improved Mode of Sealing Cans; and I do hereby declare that the following is a full and exact description of the manner of constructing and using my said improvements, reference being had to the accompanying drawings and letters of reference marked thereon.

Figure I represents a top view of a can with my improvements applied thereto. Fig. II represents a vertical section of the same, taken at the line *a a* of Fig. I.

Many experiments have been made to simplify, cheapen, and improve the means of sealing cans, and some of the devices which have proven efficient in practical use have been found to be either too complicated and expensive or too fragile to be capable of continuous use for a series of years for the purpose of preserving fruits, as is now generally practiced.

The advantages attained by the improvements embraced in my present invention, as will appear obvious upon inspection, and which are deemed by me of paramount importance in an article of this kind, are durability, cheapness of construction, and simplicity in use.

To enable others to construct and use my invention, I will describe the same by reference to the drawings which make a part of this specification.

A denotes the cover of the can, upon which is secured the strengthening guide or traverse bar C.

D indicates the annular can-top, in which is formed a depression or groove, upon which is placed an india-rubber ring-packing. A corresponding circular flange is turned down upon the edge of the cover, so as to rest upon the packing in the groove formed in the can-top.

B indicates the sliding rod or wire, which passes through the eyes *d d*, to secure the cover upon the can. This rod or wire is made of tempered metal, and is formed or bent as represented in the drawings, or with one or more angles of any desired degree, so as to act as a wedge when thrust through the eyes *d d*, which are secured upon opposite sides of the can. Although one inclination or angle of the rod will operate to secure the cover firmly down, I prefer the use of two angles—one at each end of the rod—as represented in the drawings. Not only two inclinations or angles may be given to the wire for this purpose, but a third may be made at or near the center of its length, where it bears upon the top of the cover or upon the strengthening-bar C. If the bar or rod B is curved upward, as represented in dotted lines, it will operate well, because then it could not be accidentally turned upon its axis, and thereby loosen the cover from its firmly-compressed condition upon the can-top.

It will be observed that the rod B, while it acts as a wedge (both of the inclined planes of which are upon the same or top side of the rod where it bears against the eyes *d d*) also acts as a spring, and as such it is compressed by its own action as a wedge to any desired degree—in other words, its function as a wedge operates to bring into action its other function as a spring. This device may therefore be properly denominated a "spring-wedge," inasmuch as the same substantive part performs this two-fold function. This combination in an individual part of two essential qualities in so simple and cheap a form is deemed by me as an important advance-step in the particular branch of arts to which it is thus applied.

Although my spring-wedge rod is capable of efficient use upon any suitable convex can-cover, I prefer to use it with a strengthening-bar, guide, or traverse-bar, C, which latter device was secured to me in my patent dated September 8, 1863. When used with a strengthening-bar upon the cover, the spring-wedge rod B may be applied transversely to such bar or longitudinally with the loop-formed guide-bar C, as represented in the drawings. In the former mode of application less convexity will be required in the formation of the cover; but in the latter mode a greater extent of bearing surface or friction is obtained for the rod, which aids to retain the rod in place. I have found in practice that the rod B may be given a zigzag form and operate upon the same principle, the inclinations or angles by which it is caused to act as a wedge being always necessary. When thus formed, however, it will be necessary to use the loop-formed guide or strengthening bar C, which will prevent its being turned laterally upon its axis.

Among the advantages which are secured by my improvement it may be remarked that the capability of being so applied as to give any necessary degree of pressure is prominent. This obviates a material defect which exists in that class of sealing devices which cause the pressure to be given by revolving, to a certain fixed extent, a bar or rod of rigid quality, which is incapable of efficient operation unless brought into a certain fixed position. It frequently happens in the use of this class of devices for sealing cans that the cover of the can is caused to collapse, or, on the other hand, a degree of pressure is not given sufficient to hermetically seal the can.

In using my improved means of sealing cans the spring-wedge rod B is thrust through the eyes $d\ d$ and over the cover upon which it bears. To give the necessary degree of pressure, the can may be taken by hand and so placed that the rear end of the rod is brought in contact with the edge of a table or other object, when the rod may be pressed or thrust through the eyes $d\ d$ to the desired extent. It will be apparent that many other modes may be practiced to effect this result.

Having fully described the manner of constructing and operating my invention, what I claim, and desire to secure by Letters Patent, is—

1. The spring-wedge rod B, having one or more angles or curves, and operating in the manner and for the purpose substantially as described.

2. The combination of the rod B, with a traverse or strengthening bar upon the can-cover, applied as described, for the purposes specified.

In testimony whereof I have hereunto subscribed my name this 7th day of January, A. D. 1864.

W.. WEBSTER.

Witnesses:
   H. P. K. PECK,
   CHAS. F. GUNCKEL.